United States Patent
Willis et al.

(10) Patent No.: US 7,206,372 B2
(45) Date of Patent: *Apr. 17, 2007

(54) METHODS OF REPAIRING LEAKING ELONGATE HOLLOW MEMBERS IN BOILING WATER REACTORS

(75) Inventors: Eric R. Willis, San Jose, CA (US); Sampath Ranganath, San Jose, CA (US); Paul Van Diemen, Morgan Hill, CA (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/845,318

(22) Filed: May 14, 2004

(65) Prior Publication Data
US 2004/0218708 A1    Nov. 4, 2004

Related U.S. Application Data

(63) Continuation-in-part of application No. 10/193,992, filed on Jul. 15, 2002, now Pat. No. 6,834,092.

(51) Int. Cl.
*G21C 19/00* (2006.01)

(52) U.S. Cl. .............. 376/260; 376/203; 376/292; 376/347

(58) Field of Classification Search .......... 376/260, 376/261, 204, 292, 305, 203, 347
See application file for complete search history.

(56) References Cited

U.S. PATENT DOCUMENTS

| | | | |
|---|---|---|---|
| 3,723,742 A | 3/1973 | Aranguren et al. | |
| 4,432,824 A | 2/1984 | Cook et al. | |
| 4,444,555 A | 4/1984 | Edwardsen et al. | |
| 4,480,841 A | 11/1984 | Schukei et al. | |
| 4,510,171 A | 4/1985 | Siebert | |
| 4,611,813 A | 9/1986 | Guerrero | |
| 4,647,749 A | 3/1987 | Koshy | |
| 4,826,217 A | 5/1989 | Guerrero | |
| 5,006,300 A | 4/1991 | Jonsson et al. | |
| 5,209,894 A | 5/1993 | Borrman et al. | |
| 5,274,683 A | 12/1993 | Broda et al. | |
| 5,494,539 A * | 2/1996 | Tsujimura et al. | 148/522 |
| 5,719,369 A * | 2/1998 | White et al. | 219/121.46 |
| 5,768,330 A * | 6/1998 | Andresen et al. | 376/305 |
| 5,780,804 A * | 7/1998 | White et al. | 219/121.46 |

(Continued)

OTHER PUBLICATIONS

Glass et al., "Inspection and repair techniques and strategies for Alloy 600 PWSCC in reactor vessel head CRD nozzles and welds," ICONE 10: Tenth International Conference on Nuclear Engineering, Arlington, VA, Apr. 14-18, 2002.*

*Primary Examiner*—Ricardo J. Palabrica
(74) *Attorney, Agent, or Firm*—Harness, Dickey & Pierce, P.L.C.

(57) ABSTRACT

In a method for sealing a hollow, elongate member within a reactor pressure vessel of a nuclear reactor, a section of the elongate member may be removed to separate the elongate member into an upper portion and a lower portion with an opening there between. The lower portion may be attached to a surface of the reactor pressure vessel in-situ, so as to seal off a potential leakage path through the elongate member.

13 Claims, 9 Drawing Sheets

U.S. PATENT DOCUMENTS

| | | |
|---|---|---|
| 5,796,797 A | 8/1998 | Fallas |
| 5,805,656 A * | 9/1998 | Adamson ................... 376/416 |
| 5,809,098 A | 9/1998 | Deaver |
| 6,082,444 A | 7/2000 | Harada et al. |
| 2001/0053965 A1 | 12/2001 | Horn et al. |

* cited by examiner

METHODS OF REPAIRING LEAKING ELONGATE HOLLOW MEMBERS IN BOILING WATER REACTORS

PRIORITY STATEMENT AND CONTINUATION INFORMATION

This application is a continuation-in-part of, and claims domestic priority benefits under 35 U.S.C. §120 to, U.S. patent application Ser. No. 10/193,992 to Eric R. WILLIS et al., filed Jul. 15, 2002 now U.S. Pat. No. 6,834,092 and entitled "Method of Repairing Leaking Elongate Hollow Members in Boiling Water Reactors", the entire contents of which is incorporated by reference herein.

BACKGROUND OF THE INVENTION

1. Field of the Invention

This present invention relates, in general, to repairing or sealing leaking elongate hollow members such as control rod drive housings and in-core monitor housings in a reactor pressure vessel of a nuclear reactor such as a boiling water reactor.

2. Description of the Related Art

Boiling water nuclear reactors typically may include a reactor core located within a reactor pressure vessel (RPV). A known RPV may include a substantially cylindrical shell. The shell, for example, can be about twenty feet in diameter and about seven inches thick.

The cylindrical shell may be closed at its top end by a removable top head. The top head may be removable so that components, such a fuel bundles, located in the RPV can be accessed. The RPV cylindrical shell may be closed at its bottom end by a dome shaped bottom head assembly welded to the shell.

A plurality of openings may be formed in the bottom head dome so that components, such as control rod drive assemblies, can extend within the RPV. Typically, a substantially cylindrical stub tube having a bore extending there through may be welded to the bottom head dome so that the tube bore aligns with an opening in the bottom head dome. The cylindrical stub tube may typically be fabricated from a corrosion resistant material such as stainless steel or Ni—Cr—Fe.

As an example, for a control rod drive assembly, the control rod drive housing, e.g., a tube, may be inserted through the bottom head dome opening and stub tube bore, and the housing may extend into the RPV. The control rod drive (CRD) housing may be welded to the stub tube to maintain the housing in a desired position. The stub tube thus may serve as a transition piece between the bottom head dome, which typically may be fabricated from low alloy steel, and the CRD housing, which typically may be fabricated from stainless steel such as 304 stainless steel with a high carbon content.

Inter-granular stress corrosion cracking (IGSCC) is a known phenomenon occurring adjacent to stub tube welds connecting the bottom head dome to the stub tube and connecting the stub tube to the CRD housing. Particularly, the stub tube welds may be subject to a variety of stresses associated with, for example, differences in thermal expansion, the operating pressure needed for the containment of the reactor cooling water, and other sources such as residual stresses from cold welding, cold working and other inhomogeneous metal treatments. Such stresses may, at times, cause cracks adjacent the stub tube welds.

If stress corrosion cracks adjacent stub tube welds are not sealed, such cracks may cause potential leakage paths between the stub tube and the bottom head dome, and the stub tube and the CRD housing, respectively, which is undesirable. Accordingly, upon detection of any such cracks, it may be desirable to re-seal the control rod drive housing, for example, to the bottom head dome.

Type 304 stainless steel stub tubes in some plants have become furnace sensitized as a result of vessel post weld heat treatment. This has left the stub tube in an inter-granular stress corrosion cracking (IGSCC) susceptible state, and has led to leaking cracks. Cracking has been observed in the heat affected zone of the stub tube at the CRD housing attachment weld of this susceptible material. This results in a reactor coolant leakage path to the under-vessel area. Restoration of the defective area is virtually impossible due to the location of the stub tubes and the existing material condition.

One known method of repairing or re-sealing CRD housings within the bottom head dome includes completely replacing the stub tube and CRD housing. This method, however, is time consuming, tedious, and expensive. Particularly, the housing and associated stub tube are partially cut-off and removed from the bottom head dome, and the material remaining in the bottom head assembly is inspected to ensure that such material can be welded without damaging the bottom head. A weld build-up may then be formed over the remaining material and machined so that a new stub tube can be welded to the weld build-up. Several weeks can be required to perform the replacement process of just one penetration tube. Moreover, much of the replacement work must be performed within the RPV, which requires completely unloading the RPV and is undesirable.

Another known method of repairing or re-sealing a CRD housing within the bottom head dome includes welding a sleeve to the CRD housing and the stub. This method, however, only addresses stress corrosion cracks adjacent the interface between the stub tube and the CRD housing. Moreover, installing the sleeve must be performed entirely within the RPV which, as explained above, is undesirable.

Another known method of repairing or re-sealing a CRD housing within the bottom head dome includes rolling the CRD housing into the bottom head dome. While this method may be quicker than replacing the stub tube and CRD housing, rolling the CRD housing into the bottom head dome does not create as tight a seal as a weld between the CRD housing and the dome. Moreover, the rolled CRD housing may become separated from the bottom head dome after continued RPV operation, and must then be re-rolled. Re-rolling a CRD housing, however, often is neither desirable nor practical.

Another known method of repairing or re-sealing a CRD housing within the bottom head dome includes removing and replacing a lower portion of the CRD housing within the bottom head dome. Particularly, a lower portion of the CRD housing is cut-off and removed so that an upper portion of the CRD housing remains inserted in an opening in the bottom head dome and welded to the stub tube. The bottom head dome is then cleaned, and the lower end of the remaining CRD housing upper portion is machined so that a replacement bottom portion of CRD housing can be welded to the remaining upper portion.

The replacement bottom portion of CRD housing is similarly machined so that it can be welded to the remaining upper portion. The replacement bottom portion of CRD housing is then inserted into the bottom head dome opening and positioned beneath the remaining upper portion. The replacement bottom portion and the remaining upper portion of CRD housing are temper bead welded to each other and to the bottom head dome.

Temper bead welding the remaining upper portion to the replacement lower portion and the bottom head dome may have the undesirable effect of causing high stresses because of thermal growth mismatch between the CRD housing and the bottom head dome, which are fabricated from different materials. Such temper bead welding also has the undesirable potential effect of trapping water within a leakage path and in contact with the weld between the remaining upper portion and the bottom head dome.

SUMMARY OF THE INVENTION

An exemplary embodiment of the present invention is directed to a method for sealing a hollow, elongate member within a reactor pressure vessel of a nuclear reactor. In the method, a section of the elongate member may be removed to separate the elongate member into an upper portion and a lower portion with an opening there between. The lower portion may be attached to a surface of the reactor pressure vessel in-situ, so as to seal off a potential leakage path through the elongate member.

Another exemplary embodiment of the present invention is directed to an in-situ repair method to seal a hollow, elongate hollow member within a reactor pressure vessel of a nuclear reactor. In the method, the elongate member may be cut at a given location to remove a section of the elongate member so as to form an upper portion and a lower portion with an opening between the upper and lower portions. A weld may be applied to attach the lower portion to the reactor pressure vessel so as to seal off potential leakage paths between the upper portion and lower portion.

Another exemplary embodiment of the present invention is directed to a method for sealing an elongate hollow member in-situ within a reactor pressure vessel of a nuclear reactor. The reactor pressure vessel includes a bottom head dome, a stub tube, and the elongate hollow member. The bottom head dome may have at least one opening therein, the stub tube may have first and second ends with a bore there between, and the elongate member may extend through the stub tube bore and may be secured to the stub tube adjacent the stub tube first end with an upper stub tube attachment weld. A section of the elongate member may be cut out at a location below the upper stub tube weld to separate the elongate member into an upper portion and a lower portion. The lower portion may be attached to a different location at the bottom head dome opening than where the elongate member was cut with a weld. The weld may be formed on an interior surface of the bottom head dome opening at an upper end of the lower portion, with application of the weld forming a heat affected zone. A corrosion resistant material may be applied on the heat-affected zone.

Another exemplary embodiment of the present invention is directed to a control rod drive housing within a reactor pressure vessel of a nuclear reactor. The control rod drive housing is inserted within a stub tube through a bottom head dome of the reactor pressure vessel, and at least part of the control rod drive housing may be fixedly secured to the bottom head dome via the stub tube. The control road drive housing may include an upper portion and a lower portion. The lower portion may be formed by cutting the control rod drive housing to remove a section of the control rod drive housing below the stub tube. The lower portion may be subjected to an in-situ repair to seal potential leakage paths in the control rod drive housing.

Another exemplary embodiment of the present invention is directed to an in-core monitor housing within a reactor pressure vessel of a nuclear reactor. The in-core monitor housing is inserted within a stub tube weld buildup through a bottom head dome of the reactor pressure vessel, and at least part of the in-core monitor housing may be fixedly secured to the bottom head dome via the stub tube weld buildup. The in-core monitor housing may include an upper portion and a lower portion. The lower portion may be formed by cutting the in-core monitor housing to remove a section of the in-core monitor housing below the stub tube weld buildup. The lower portion may be subjected to an in-situ repair to seal potential leakage paths in the in-core monitor housing.

DETAILED DESCRIPTION OF THE EXEMPLARY EMBODIMENTS

Figure 1:
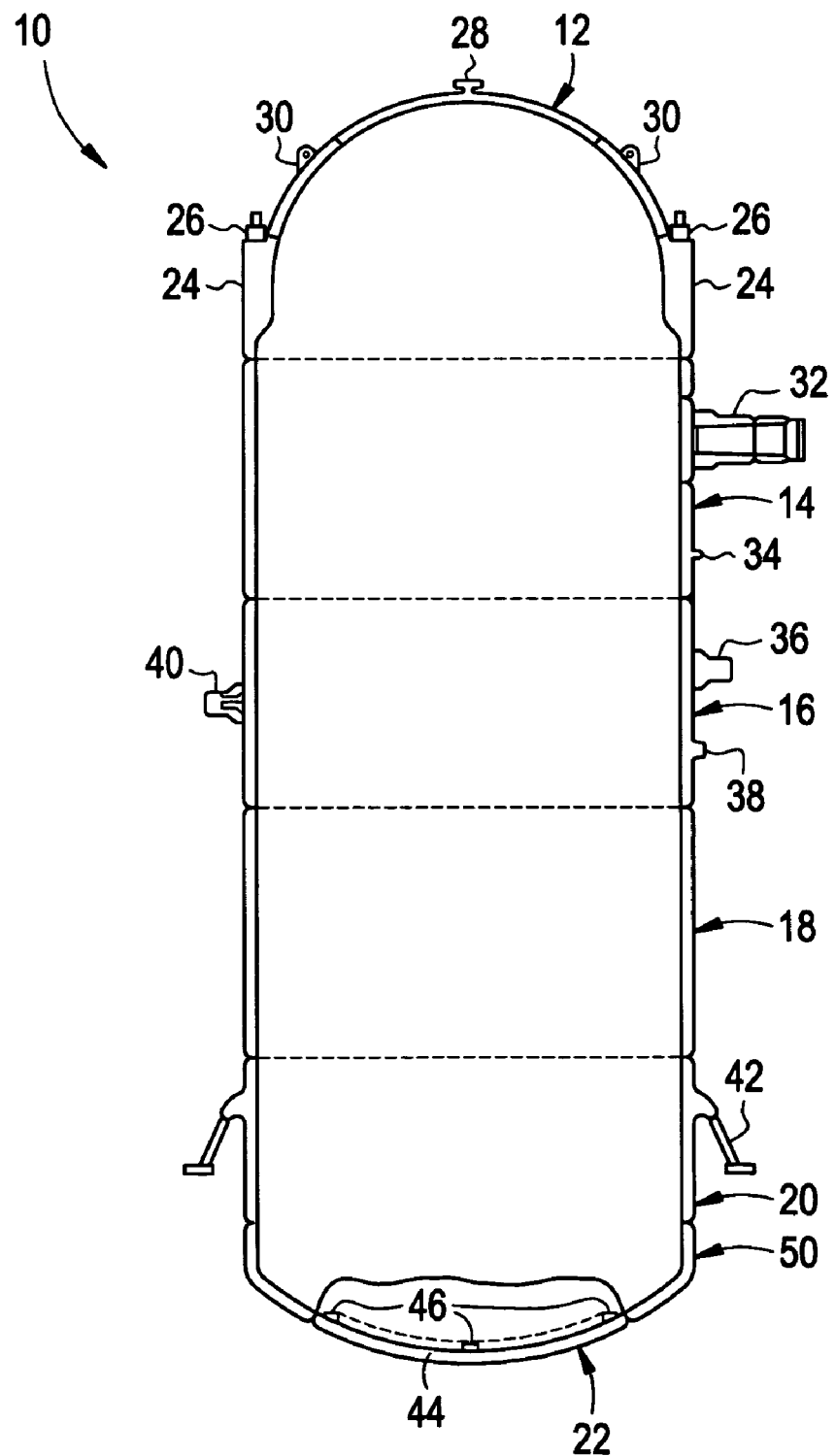
FIG. 1 is a schematic illustration of a reactor pressure vessel.

FIG. 1 is a schematic illustration of a reactor pressure vessel (RPV) 10. RPV 10 includes a top head 12, four substantially cylindrical shell courses 14, 16, 18 and 20, and a bottom head assembly 22. Top head 12 includes a head flange 24. First shell course 14 includes a vessel flange (not shown). Top head 12 is bolted to first shell course 14 by bolts 26 which extend through head flange 24. Top head 12 also includes a head spray and vent nozzle 28 and lifting flanges 30 used when lifting top head 12 from first shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Fourth shell course 20 includes a support skirt 42 welded thereto. Support skirt 42 is utilized to support RPV 10 within the reactor housing (not shown).

Bottom head assembly 22 includes a bottom head dome 44 having a plurality of stub tubes 46 welded thereto. Stub tubes 46 are substantially cylindrical and each stub tube 46 has a bore (not shown in FIG. 1) extending there through. The bore of each stub tube 46 is aligned with an opening (not shown in FIG. 1) in bottom head dome 44. Components such as control rod drives, in-core instruments, pressure instrument nozzles, and drain nozzles extend through such bottom head dome openings and stub tube bores and penetrate into RPV 10.

FIG. 1 is provided primarily for illustrative purposes to show a typical bottom head assembly 22. The present invention, as described below in the exemplary embodiments, can be used in many RPV configurations other than RPV 10.

Figure 2:
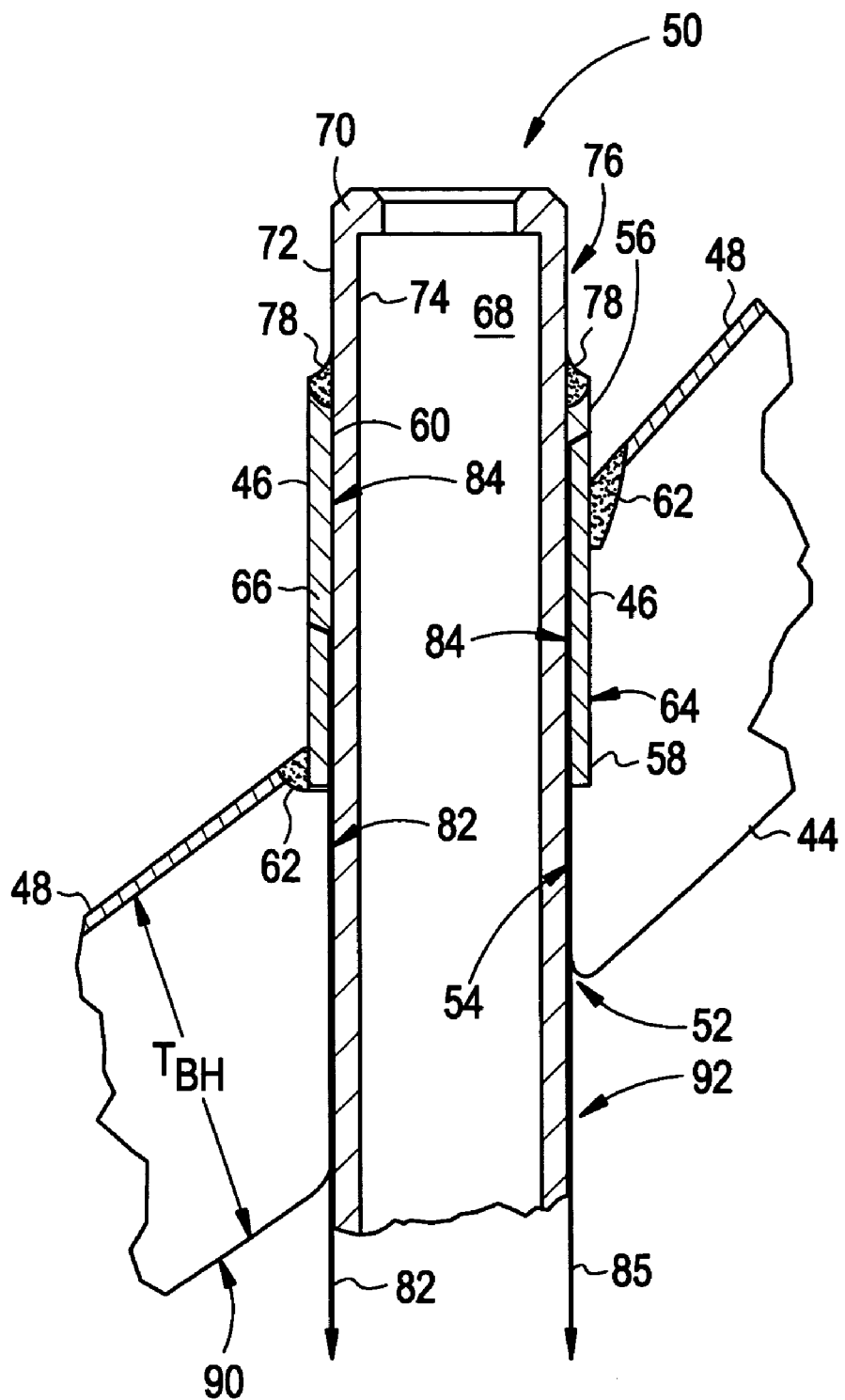
FIG. 2 is a partial cross-sectional view of a control rod drive housing, a stub tube, and a bottom head of a reactor pressure vessel to illustrate a potential leakage path to be sealed and/or repaired, in accordance with an exemplary embodiment of the present invention.

FIG. 2 is a partial cross-sectional view of a control rod drive housing, a stub tube, and a bottom head of a reactor pressure vessel to illustrate a potential leakage path to be sealed and/or repaired, in accordance with an exemplary embodiment of the present invention.

Referring to FIG. 2, bottom head dome 44 may be fabricated from low alloy steel, may have a thickness TBH and a stainless steel cladding 48 and may include a substantially cylindrical opening 52 therein defined by a sidewall 54, for receiving a control rod drive (CRD) housing 50 and a stub tube 46. CRD housing 50 may be fabricated of compatible corrosion resistant materials such as Type 304 stainless steel of Ni—Cr—Fe, and stub tube 46 of Type 304 stainless steel that is furnace sensitized and overlaid, for example. Stub tube 46 may include a first end 56 and a second end 58, with a stub tube bore 60 extending between first and second ends 56 and 58. Stub tube 46 may be positioned concentric to bottom head dome opening 52 so that the stub tube bore 60 may be substantially aligned with bottom head dome opening 52, for example.

Stub tube 46 may be secured to bottom head dome 44 with a lower stub tube attachment weld 62. An outer surface 64 of stub tube sidewall 66 proximate second end 58 may be welded to bottom head dome 44 with lower stub tube attachment weld 62.

CRD housing 50 may include a first end (not shown), a second end (not shown), and a bore 68 extending between the first and second ends. Control rod drive housing 50 may have a substantially hollow cylindrical geometric shape including a sidewall 70 having an outer surface 72 and an inner surface 74 which defines bore 68.

CRD housing 50 may be positioned so that it extends through bottom head dome opening 52 and stub tube bore 60. An upper portion 76 of CRD housing 50 may be secured to stub tube 46 with an upper stub tube attachment weld 78 adjacent stub tube first end 56 so that CRD housing 50 may be substantially concentrically and fixedly secured within stub tube 46. The positioning and welding of CRD housing 50 within stub tube 46 and bottom head dome 44 is well known.

Stress corrosion cracks sometimes may occur adjacent upper stub tube attachment weld 78 or lower stub tube attachment weld 62. If such a crack occurs adjacent upper weld 78, an annulus leakage path 82 may be formed between an inner surface 84 of stub tube sidewall 66 and outer surface 72 of CRD housing 50, as shown in FIG. 2. Similarly, if such a crack occurs adjacent lower weld 62, an annulus leakage path 85 may be formed between outer surface 72 of CRD housing 50 and sidewall 54 of bottom head dome opening 52.

Figure 3:
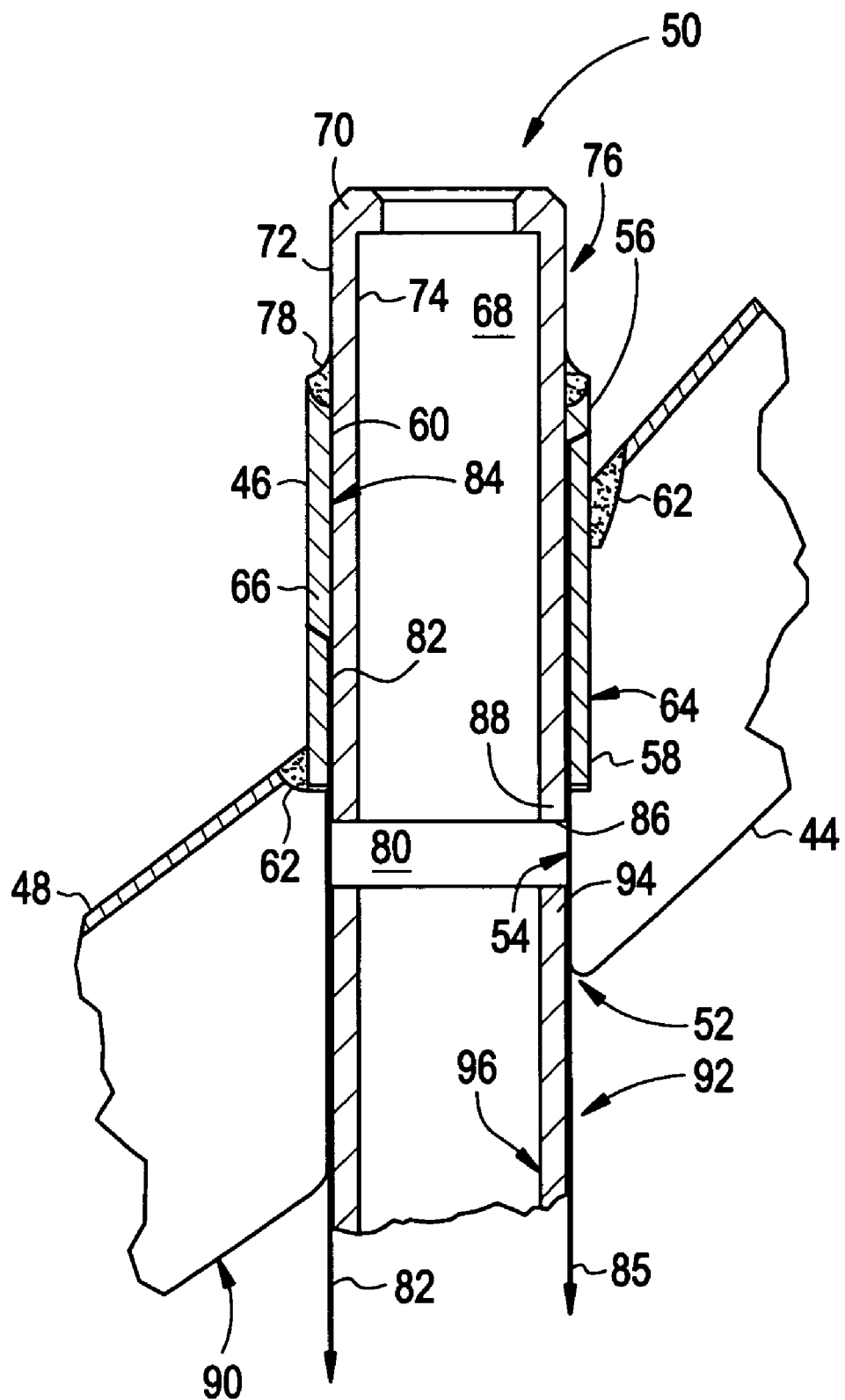
FIG. 3 is a modification of the partial cross-sectional view of FIG. 2 to describe an intermediate step of removing a section of the control rod drive housing, in accordance with an exemplary embodiment of the present invention.

FIG. 3 is a modification of the partial cross-sectional view of FIG. 2 to describe an intermediate step of removing a section of the CRD housing, in accordance with an exemplary embodiment of the present invention. To seal these leakage paths, the CRD housing 50 may require repair. The repair work can be performed from the under-vessel with a water tight (temporary) seal placed over the stub tube from inside the vessel, for example. The reactor vessel remains flooded to provide radiation shielding and reduce overall outage time.

To seal annulus leakage paths 82 and 85 in accordance with an exemplary embodiment of the present invention, CRD housing 50 may be cut at a location 86 below upper stub tube attachment weld 78. For example, CRD housing 50 may be cut at location 86 at a desired point below stub tube second end 58 to remove a section of CRD housing 50, so as to separate upper portion 76 of CRD housing 50 from a lower portion 92 of CRD housing 50, forming an opening 80, as shown in FIG. 3. The lower portion 92 is not removed, but remains in place for an in-situ repair.

The width (or height) of the sectional cut out may be based on providing sufficient clearance for a weld help of a welding apparatus to apply a weld to attach lower portion 92 to RPV 10, as will be described in further detail below. For example, the opening 80 may be of a size that is about 2–3 times the weld thickness of an eventual weld applied by the weld head, so as to provide sufficient room for the weld head.

After cutting the lower portion 92, the bottom head dome opening 52 may be cleaned. For example, a grinder (not shown) may be extended into bottom head dome opening 52, through bore 68 into lower portion 92 within opening 80, and utilized to grind sidewall 54 of bottom head dome opening 52 between a lower end 88 of upper portion 76 and a bottom end 90 of bottom head dome 44 to form a weld passage (e.g., area over which a weld may be applied) between lower end 88 and bottom end 90. Alternatively, bottom head dome opening 52 may be cleaned with a flapper wheel or by honing. Methods for cleaning bottom head dome opening 52 are known and are not described herein for reasons of brevity.

Figure 4:
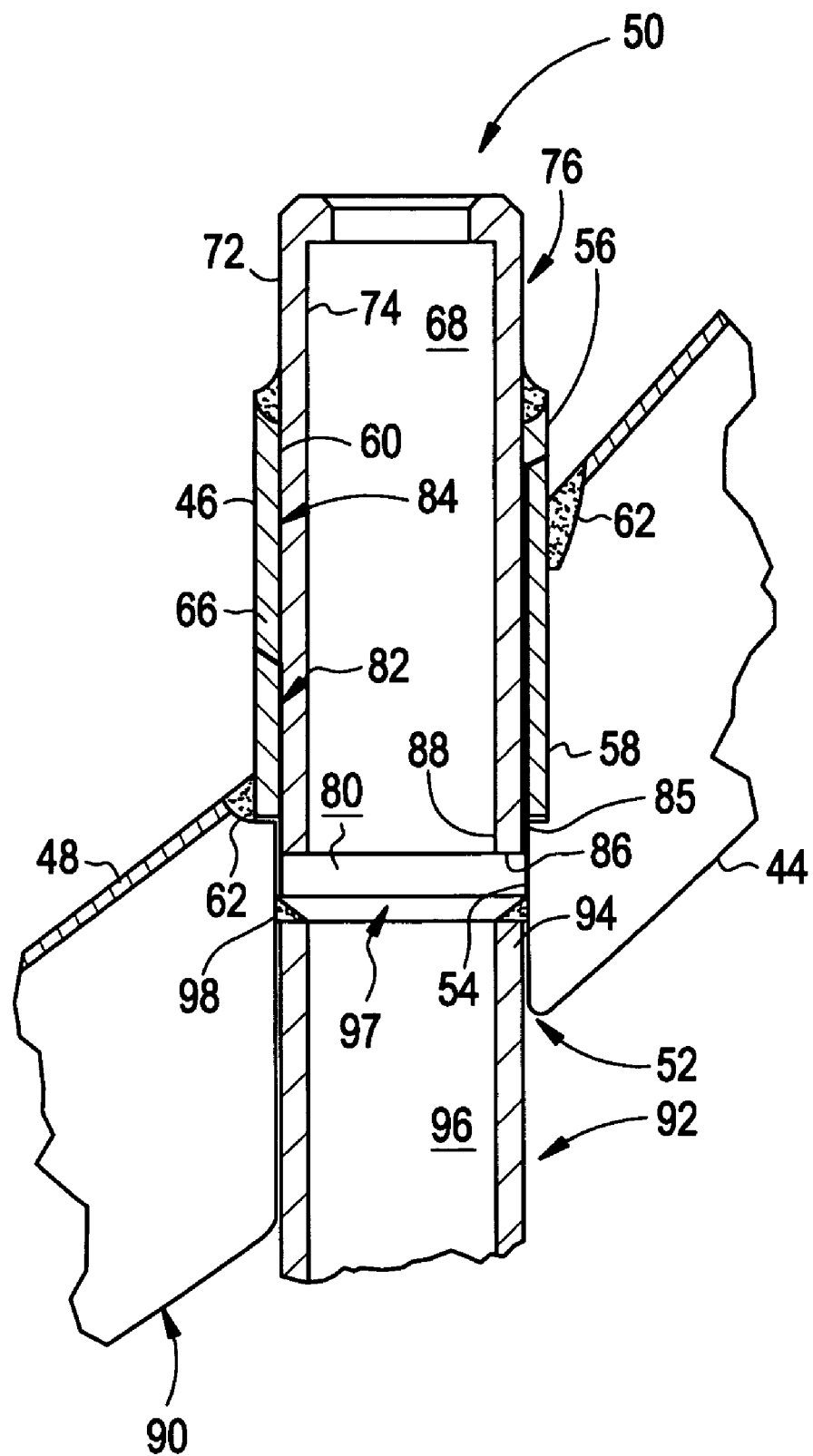
FIG. 4 is a modification of the partial cross-sectional view of FIG. 3 to describe an intermediate step of applying a temper bead weld to attach a lower portion of the control rod drive housing to a surface of the reactor pressure vessel, in accordance with an exemplary embodiment of the present invention.

FIG. 4 is a modification of the partial cross-sectional view of FIG. 3 to describe an intermediate step of applying a temper bead weld to attach a lower portion of the CRD housing to a surface of the reactor pressure vessel, in accordance with an exemplary embodiment of the present invention. The existing lower portion 92 that remains in place for the repair may then be attached to a surface of the RPV 10, such as at the sidewall 54 of the bottom head dome opening 52, so that it may be substantially aligned with and adjacent to upper portion 76. Existing lower portion 92 may be a substantially hollow member having a substantially cylindrical geometric shape. Existing lower portion 92 includes an upper end 94, a lower end (not shown), and through bore 96 extending between the upper end 94 and the lower end.

The upper end 94 of existing lower portion 92 may include a weld prep 98 for welding upper end 94 to sidewall 54 of bottom head dome opening 52. The upper end 94 of existing lower portion 92 may be cleaned in accordance with known methods so that upper end 94 has a substantially frusto-conical geometric shape. This may provide a clean oxide-free surface to form weld prep 98. For example, a grinder may be used to grind upper end 94. Alternatively, upper end 94 may be cleaned with a flapper wheel or by honing.

Existing lower portion 92 may be attached, in-situ, to sidewall 54 bottom head dome opening 52 so that upper end 94 is proximate lower end 88 of remaining upper portion 76, and so that control rod housing bore 68 remains substantially aligned with through bore 96. As shown in FIG. 4, upper end 94 of existing lower portion 92 may be spaced from lower end 88 of remaining upper portion 76, with opening 80 there between. The pressure seal weld has thus been moved from the upper stub tube attachment weld 78 to the weld prep 98 at opening 80. In other words, after application of weld prep 98 and an eventual attachment weld 97 at opening 80, upper stub tube attachment weld 78 is no longer a pressure weld and the annulus leakage path 82 between the inner surface 84 of stub tube sidewall 66 and the outer surface 72 of CRD housing 50 (or alternatively annulus leakage path 85 between outer surface 72 and sidewall 54) are no longer leak paths since the pressure in these paths equals the pressure in bore 68.

Thus, the lower portion 92 within bottom head dome opening 52 may be attached to sidewall 54 of bottom head dome opening 52 without also being secured to lower end 88 of remaining portion 76. For example, the existing lower portion 92 may be attached at a point or location that is different from the location where it was initially cut, e.g., lower than where lower portion 92 was cut initially at location 86 below the stub tube second end 58, to separate upper portion 76 of CRD housing 50 from lower portion 92. Upper end 94 of lower portion 92 may be bead welded to provide a weld 97 at upper end 94 (partially filling opening 80, as shown in FIG. 4), using known welding methods such as temper bead welding techniques, for example, at sidewall 54 of bottom head dome opening 52.

The weld 97 may be provided at a location that is below potential differential leakage paths in the CRD 50. For example, this location may be at a point that is lower than annulus leakage path 82 between inner surface 84 of stub tube sidewall 66 and outer surface 72 of CRD 50; and/or below annulus leakage path 85 formed between outer surface 72 of CRD housing 50 and sidewall 54 of bottom head dome opening 52, as shown in FIG. 2.

To form the weld 97, an automatic welding machine may be inserted in through bore 96 so that a welding head is substantially adjacent to weld prep 98. The automatic welding machine then may be used to apply a temper bead weld 97 to sidewall 54 of bottom head dome opening 52, as is known. A UT machine, for example, may then be inserted in through bore 96 to ascertain the quality of the bead weld.

Figure 5:
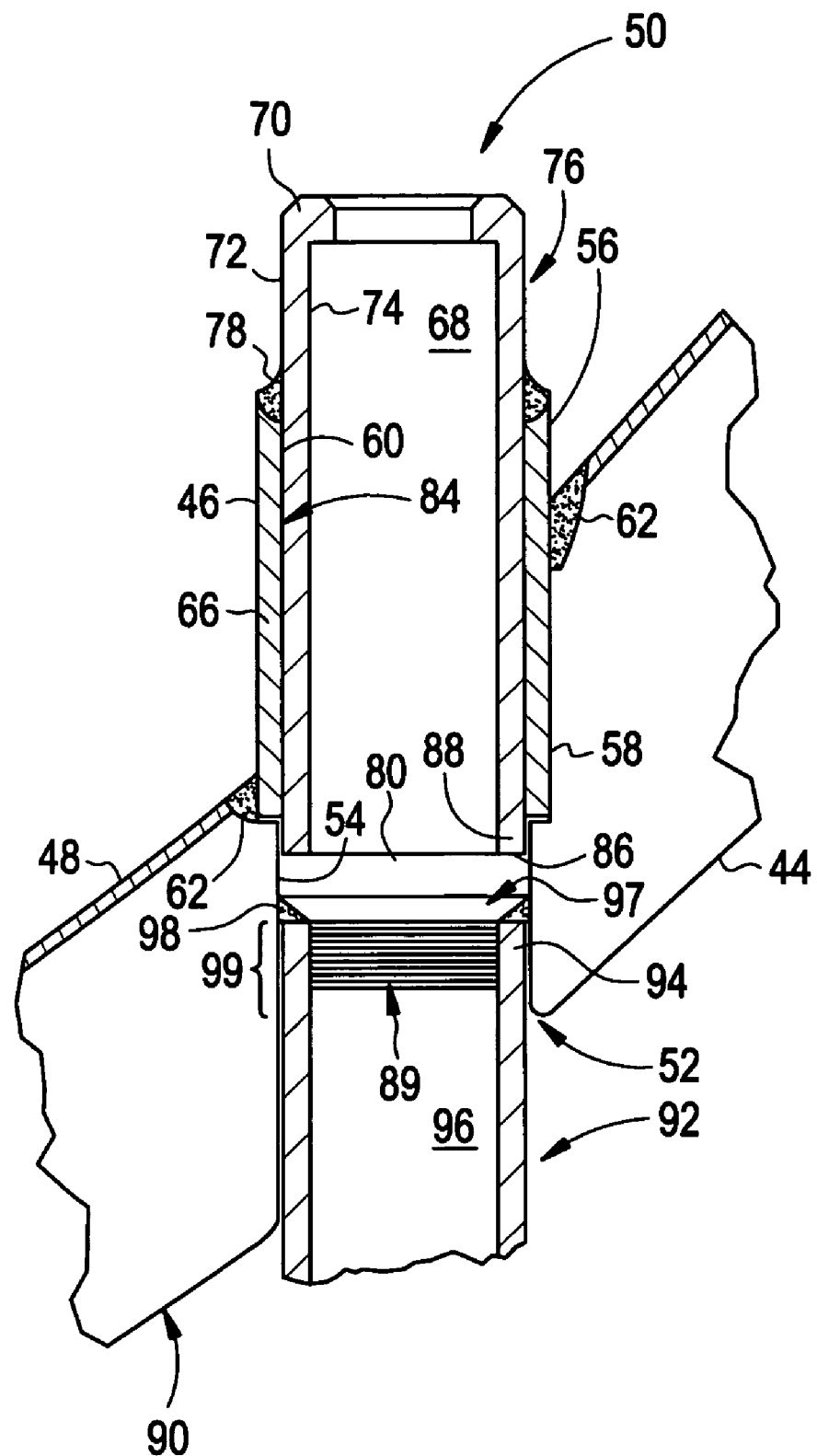
FIG. 5 is a modification of the partial cross-sectional view of FIG. 4 to describe a step of applying an overlay corrosion resistant material at a heat affected zone on the lower portion of the control road drive housing, in accordance with an exemplary embodiment of the present invention.

FIG. 5 is a modification of the partial cross-sectional view of FIG. 4 to describe a step of applying an overlay corrosion resistant material at a heat affected zone on the lower portion of the control rod drive housing, in accordance with an exemplary embodiment of the present invention. The welding of existing lower portion 92 in-situ to attach it to the bottom head dome 44 at bottom head dome opening 52 may introduce a new heat affected zone 99 in the high carbon stainless steel at weld 97, which ordinarily may be susceptible to IGSCC. As shown in FIG. 5, the heat affected zone 99 may be covered with a corrosion resistant material, which may be a cladding 89 that is applied over the heat affected zone 99 of weld 97. The application of corrosion resistant cladding 89 may thus reduce the probability of introducing a new potential failure mechanism, for example.

To apply the cladding, the CRD housing 50 may be sealed at the top, near upper section 76 to provide a dry environment inside. The outside of the CRD housing 50 remains wet. In general, an apparatus or tool such as a weld head may be inserted from a bottom end (not shown) of the CRD housing 50. The weld head may be as much as 13 feet in length or longer. As described in further detail below, the weld head may include a gas-tungsten arc welding head near the top of the weld head. The gas-tungsten arc welding head may include a torch and a weld wire feeder, and rotates and moves up or down, in a slow manner in order to apply a thin cladding layer.

The cladding 89 is corrosion resistant due to its fine ferrite structure. The cladding material typically may consist of a metal alloy, such as Alloy 82, Type 308L stainless steel or Type 316L stainless steel; however, the cladding applicable to the exemplary embodiments of the present invention is not limited to these alloys.

Additionally, cladding 89 may be alloyed with a noble metal to provide additional mitigation to stress corrosion cracking. A welding apparatus and technique used to apply the cladding with alloyed noble metal is described in commonly assigned U.S. patent application Ser. No. 09/416,943 to OFFER et al., entitled APPARATUS AND METHOD FOR CORROSION RESISTANT CLADDING, the contents of which are hereby incorporated by reference in their entirety. Briefly described, the welding technique joins the cladding 89 to the heat affected zone 99, which is a region susceptible to stress corrosion cracking. The cladding 89 may be applied under conditions of low heat input to achieve reduced or no thermal sensitization at the edges of the newly clad region.

The welding apparatus may apply a cladding that includes a filler material comprised of nickel-base alloys or iron-base stainless steels such as the aforementioned Inconel 82, Stainless 308L or Stainless 316L, for example, which may be alloyed with a low concentration of a noble metal element (e.g., palladium, platinum, rhodium, or combinations thereof) to act as a catalyst for improved recombination rates of oxygen with hydrogen, at reduced hydrogen addition levels. The concentration of noble metal in the filler material may be in the region of about 1% by weight or less, such as within a range of about 0.25 to 0.75% by weight after dilution by base metal. Recombination of the oxygen and hydrogen peroxide with hydrogen may reduce the effective electrochemical potential, in order to reduce the susceptibility to IGSCC.

The welding apparatus may remotely apply the cladding 89 at a significant distance from the end of the apparatus, as noted above. The welding apparatus may have the ability to provide a substantially stable arc voltage (and corresponding arc length control) even though the torch is positioned far from weld head drive mechanisms. The welding apparatus may include a rotating wire feeder which produces a wire pool substantially far downstream of the distal end of the wire feeder. Weldability at substantially low, yet stable, wire feed rates (e.g., approximately 60–80 cm/min) may therefore be improved, enabling substantially thin cladding to be reliably deposited, with a cladding thickness in a range of about 0.3–0.6 mm, and more preferably between about 0.36 to 0.45 mm thick.

The welding torch of the welding apparatus may use a sufficiently low heat input (in a range of about 0.6–1.0 kJ/cm, for example) so that a required through-wall temperature gradient for far-wall stress improvement may be obtained, even without liquid cooling on a far wall.

The reduced heat input to apply the cladding 89 may be produced in part by a travel speed (torch speed) in excess of about 10 inches per minute, for example 15 to 40 inches per minute, more usually about 15–30 inches per minute, so that the time in the sensitizing temperature range during cooling of the applied cladding 89 is insufficient to allow carbides to precipitate on the grain boundaries.

Sensitization control may be effected utilizing dual controls on welding parameters: (1) heat input (controlled as a function of the heat input per unit length of bead), and (2) heat affected zone cooling rate (controlled as a function of the welding linear speed in the forward direction). Undesirable cross-bead arc oscillation may be avoided, since it is counterproductive with respect to maintaining both the required low heat input and high travel speed. Thus, electric-arc based cladding processes may be applied to the heat affected zone 99 even with very low resistance to thermal sensitization, and without high risk of sensitization.

In another exemplary embodiment, the method of permanently repairing or sealing an elongate hollow member such as CRD housing/stub tube may also be applied to in-core monitor housings (ICMH). An ICMH is smaller diameter vessel penetration than the CRD housing/stub tube located in a reactor pressure vessel bottom head region. There are typically between about 29–70 ICMH's, depending upon the size of the reactor pressure vessel. In an alternative embodiment, the method may be applied to ICMHs that do not contain a stub tube but include a stub tube weld buildup that approximates the functions and structure of a stub tube. The welding apparatus described above for applying cladding 89 over the heat affected zone 99 in the exemplary embodiments directed to the CRD housing 50 may also be used to apply a weld and cladding over desired surfaces of the ICMH's, as to be described further below. The weld may be a metal that may be alloyed with a noble metal to reduce susceptibility to IGSCC, for example.

Figure 6:
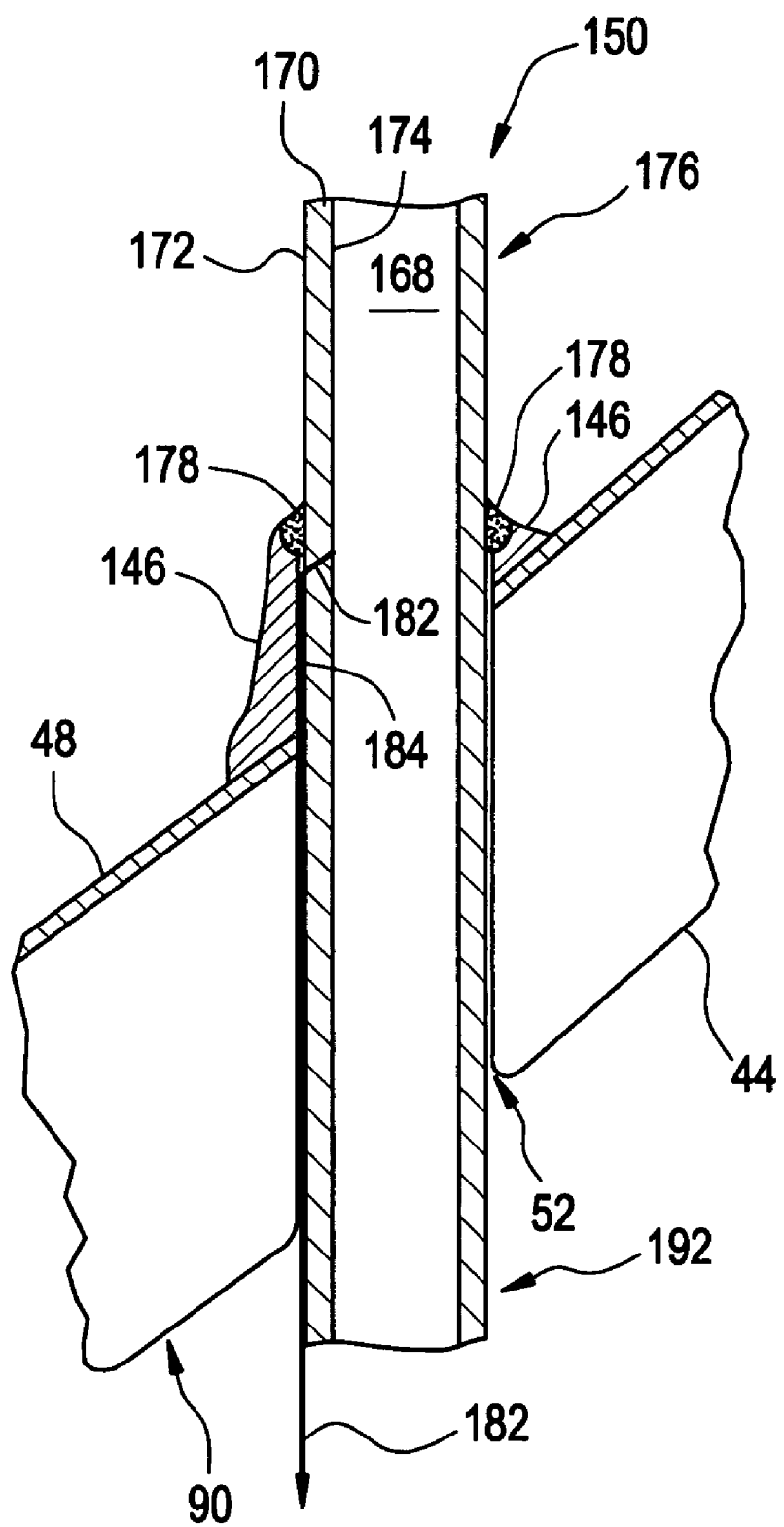
FIG. 6 is a partial cross-sectional view of an in-core monitor housing, a stub tube weld buildup, and a bottom head of a reactor pressure vessel to illustrate a potential leakage path to be sealed and/or repaired, in accordance with another exemplary embodiment of the present invention.

FIG. 6 is a partial cross-sectional view of an in-core monitor housing, a stub tube weld buildup, and a bottom head of a reactor pressure vessel to illustrate a potential leakage path to be sealed and/or repaired, in accordance with another exemplary embodiment of the present invention.

ICMH 150 may be fabricated of compatible corrosion resistant materials such as Type 304 stainless steel of Ni—Cr—Fe, and may be secured through a bottom head dome opening 52 of bottom head dome 44 with a stub tube weld buildup 146 that is attached to vessel cladding 48 (or directly to the bottom head dome 44) at one end and to a J-weld 178 at another end. Stub tube weld buildup 146 may be of a corrosion resistant material such as Type 304 stainless steel that is furnace sensitized and overlaid, for example.

ICMH 150 may include a first end (not shown), a second end (not shown), and a bore 168 extending between the first and second ends. ICMH 150 may have a substantially hollow cylindrical geometric shape including a sidewall 170 having an outer surface 172 and an inner surface 174 which defines bore 168.

ICMH 150 may be positioned so that it extends through bottom head dome opening 52. An upper portion 176 of ICMH 150 may be secured to stub tube weld buildup 146 with a J-weld 178, so that ICMH 150 may be substantially concentrically and fixedly secured within stub tube weld buildup 146.

As discussed above, stress corrosion cracks sometimes may occur adjacent J-weld 178. The process of applying J-weld 178 may create a heat affected zone (no shown) that is susceptible to IGSCC, and which could cause a crack above or below J-weld 178. If such a crack occurs adjacent J-weld 178, an annulus leakage path 182 may be formed between an inner surface 184 of stub tube buildup 146 and outer surface 172 of ICMH 150, as shown in FIG. 6. For reasons of brevity, only one leakage path 182 is shown, it being understood that a leakage path may be formed between outer surface 172 of ICMH 150 and sidewall 54 of bottom head dome opening 52.

Figure 7:
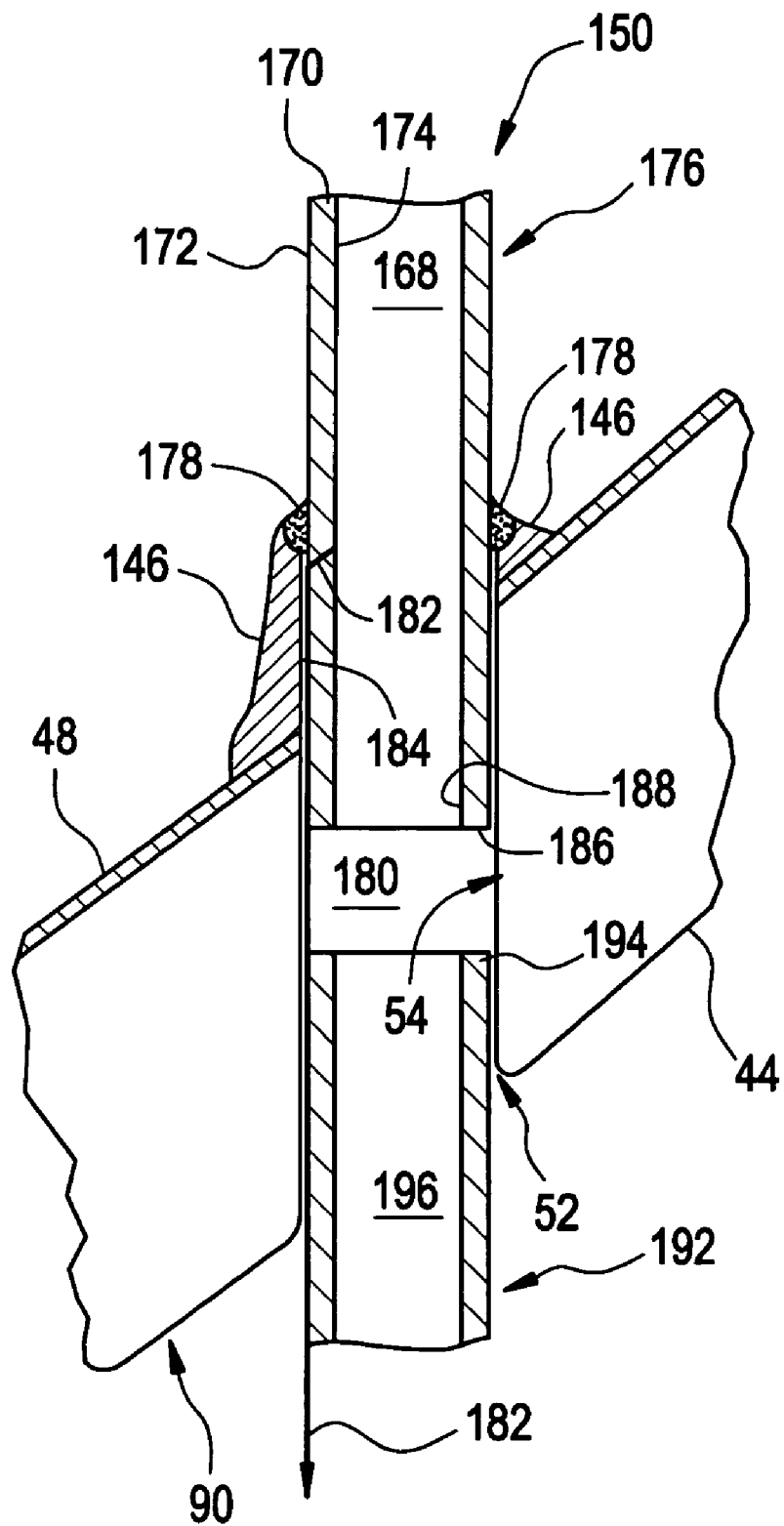
FIG. 7 is a modification of the partial cross-sectional view of FIG. 6 to describe an intermediate step of removing a section of the in-core monitor housing, in accordance with an exemplary embodiment of the present invention.

FIG. 7 is a modification of the partial cross-sectional view of FIG. 6 to describe an intermediate step of removing a section of the in-core monitor housing, in accordance with an exemplary embodiment of the present invention. To seal these leakage paths, the ICMH 150 may require repair similar to as described above with respect to CRD housing 50. The repair work can be performed from the under-vessel with a water tight (temporary) seal, and the reactor vessel remains flooded to provide radiation shielding and reduce overall outage time.

To seal annulus leakage path 182 in accordance with another exemplary embodiment of the present invention, ICMH 150 may be cut at a location 186 below J-weld 178 and/or stub tube weld buildup 146, as shown in FIG. 7, and a section may be removed from ICMH 150 so as to separate upper portion 176 of ICMH 150 from a lower portion 192 of ICMH 150, forming an opening 180. For example, the ICMH 150 may be cut below the lowest elevation of weld buildup 146, so that the region encompassing opening 180 is adjacent the sidewall 54 of the bottom head dome opening 52, as shown in FIG. 7. The lower portion 192 is not removed, but remains in place for an in-situ repair. After cutting the lower portion 192, the bottom head dome opening 52 may be cleaned as described above and thus not repeated herein for reasons of brevity.

Figure 8:
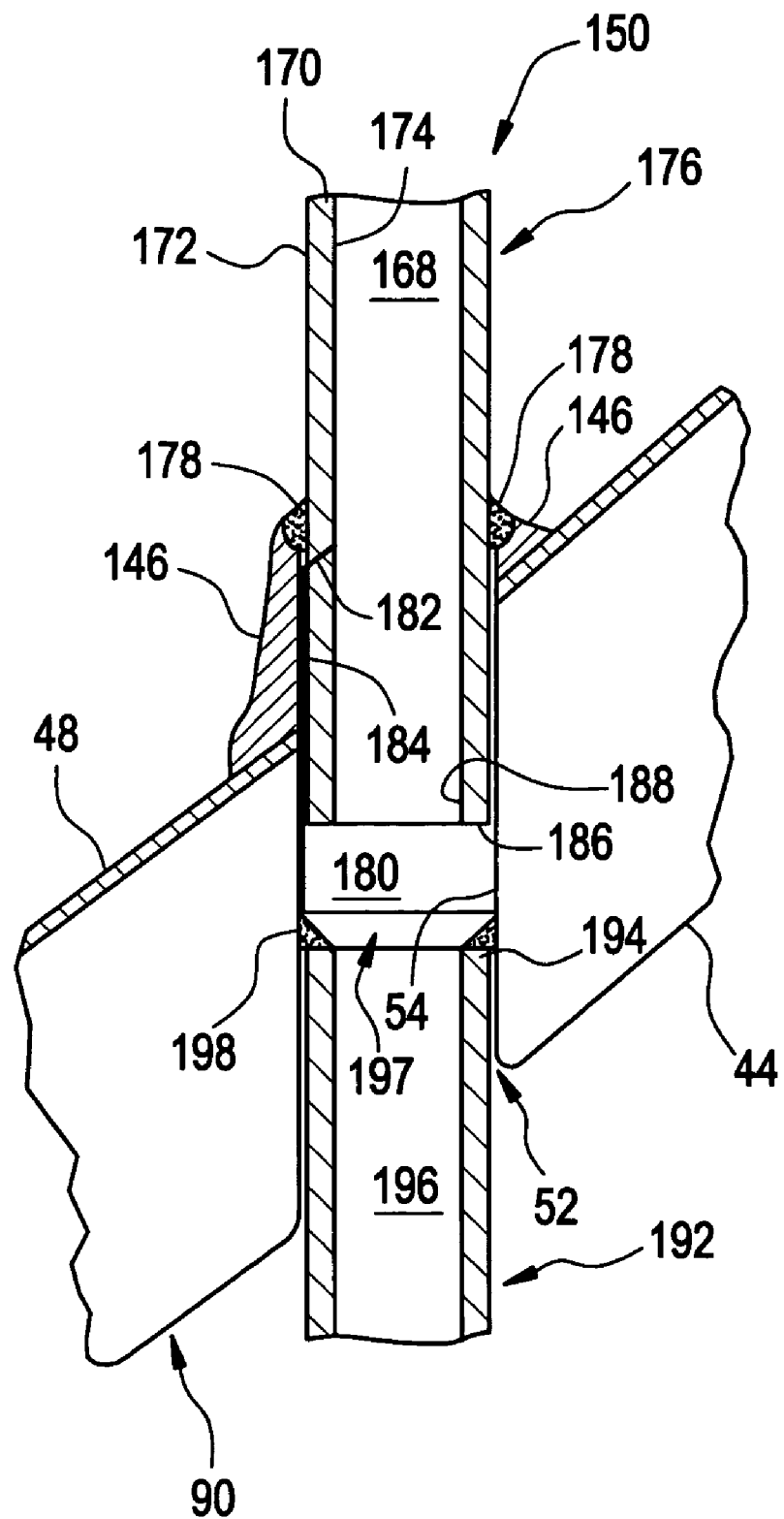
FIG. 8 is a modification of the partial cross-sectional view of FIG. 7 to describe an intermediate step of applying a temper bead weld to attach a lower portion of the in-core monitor housing to a surface of the reactor pressure vessel, in accordance with an exemplary embodiment of the present invention.

FIG. 8 is a modification of the partial cross-sectional view of FIG. 7 to describe an intermediate step of applying a temper bead weld to attach a lower portion of the in-core monitor housing to a surface of the reactor pressure vessel, in accordance with an exemplary embodiment of the present invention. The existing lower portion 192 that remains in place for the repair may then be attached to a surface of the RPV 10, such as at the sidewall 54 of the bottom head dome opening 52, so that it may be substantially aligned with and adjacent to upper portion 176. Existing lower portion 192 may be a substantially hollow member having a substantially cylindrical geometric shape. Existing lower portion 192 includes an upper end 194, a lower end (not shown), and a through bore 196 extending between the upper end 194 and the lower end.

The upper end 194 of existing lower portion 192 may include a weld prep 198 for welding upper end 194 to sidewall 54 of bottom head dome opening 52. The upper end 194 of existing lower portion 192 may be cleaned in accordance with known methods, such as described above, so that upper end 194 has a substantially frusto-conical geometric shape. This may provide a clean oxide-free surface to form weld prep 198.

Existing lower portion 192 may be attached, in-situ, to sidewall 54 of bottom head dome opening 52 so that upper end 194 is proximate lower end 188 of remaining upper portion 176, and so that ICMH bore 168 remains substantially aligned with through bore 196. As shown in FIG. 8, upper end 194 of existing lower portion 192 may be spaced from lower end 188 of remaining upper portion 176, with opening 180 there between. After application of weld prep 198 and an eventual attachment weld 197 at opening 180, J-weld 178 is no longer a pressure weld and the annulus leakage path 182 between inner surface 184 of stub tube buildup 146 and the outer surface 172 of ICMH 150 (or alternatively annulus leakage path 185 between outer surface 172 and sidewall 54) are no longer leak paths since the pressure in these paths equals the pressure in bore 168.

Thus, the lower portion 192 within bottom head dome opening 52 may be attached to sidewall 54 of bottom head dome opening 52 without also being secured to lower end 188 of remaining upper portion 176. For example, the existing lower portion 192 may be attached at a point or location that is different from the location where it was initially cut, e.g., lower than where lower portion 192 was cut at location 186 to separate upper portion 176 of ICMH 150 from lower portion 192. Upper end 194 of lower portion 192 may be bead welded to provide a weld 197, using known welding methods such as described above, at sidewall 54 of bottom head dome opening 52.

The weld 197 may be provided at a location that is below potential differential leakage paths in the ICMH 150, such as at a point lower than annulus leakage path 182 between inner surface 184 of stub tube buildup 146 and outer surface 172 of ICMH 50; and/or below a leakage path that is formed between outer surface 172 and sidewall 54 of bottom head dome opening 52. The weld may be formed by techniques as described above, thus a detailed explanation is omitted here for reasons of brevity.

Figure 9:
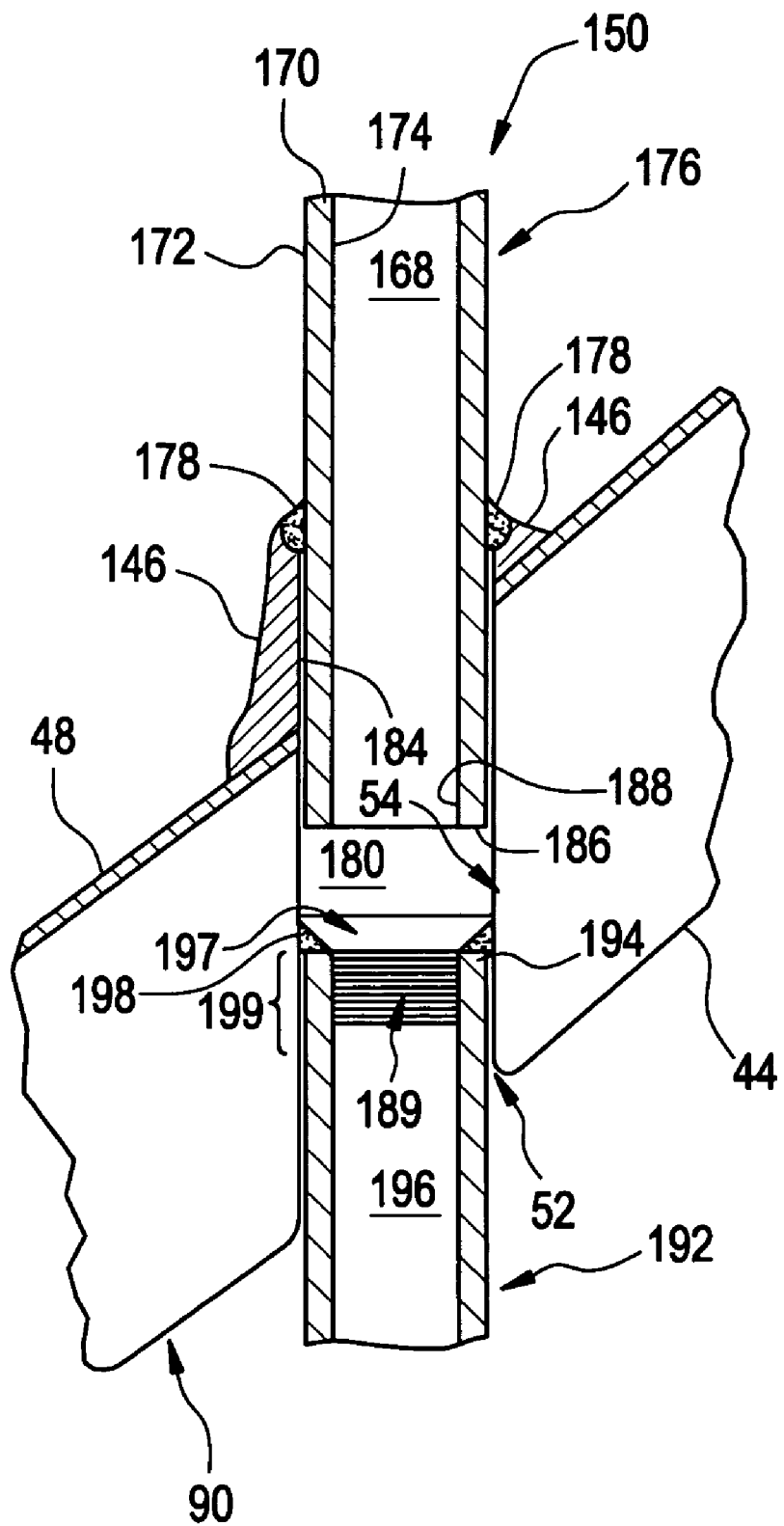
FIG. 9 is a modification of the partial cross-sectional view of FIG. 8 to describe a step of applying an overlay corrosion resistant material at a heat affected zone on the lower portion of the in-core monitor housing, in accordance with an exemplary embodiment of the present invention.

FIG. 9 is a modification of the partial cross-sectional view of FIG. 8 to describe a step of applying an overlay corrosion resistant material at a heat affected zone on the lower portion of the in-core monitor housing, in accordance with an exemplary embodiment of the present invention. The welding of existing lower portion 192 in-situ to attach it to the bottom head dome 44 at bottom head dome opening 52 may introduce the aforementioned heat affected zone 199 in the high carbon stainless steel at weld 197, which ordinarily may be susceptible to IGSCC. As shown in FIG. 9, the heat affected zone 199 may be covered with a corrosion resistant material, which may be a cladding 189 that is applied over the heat affected zone 199 of weld 197. The application of corrosion resistant cladding 189 may thus reduce the probability of introducing a new potential failure mechanism, for example.

The cladding may be applied as described above with respect to FIG. 5, thus a detailed explanation is omitted here for reasons of brevity. The cladding 189 is corrosion resistant due to its fine ferrite structure, and may consist of a metal alloy, such as Alloy 82, Type 308L stainless steel or Type 316L stainless steel; however, the cladding applicable to this exemplary embodiment is not limited to these alloys. Further as describe above, cladding 189 may be alloyed with a noble metal to provide additional mitigation to stress corrosion cracking, such as is described in the commonly assigned application '943 to OFFER et al.

The methodologies described in FIGS. 6–9 may also be applicable to ICMHs which may have potential through wall cracks in what is known as a 'low-profile stub tube weld buildup' due to IGSCC, which may cause leakage paths between an inner surface of the low-profile stub tube weld buildup and an outer surface of the ICMH, down through the bottom head dome opening 52, similar to as shown in FIG. 6. A low-profile stub tube weld buildup has a substantially small weld height as compared to the weld buildup 178 shown in FIG. 6, for example.

Accordingly, the above-described methods in accordance with the exemplary embodiments may facilitate permanent repairs of stress corrosion cracks adjacent the upper stub tube weld and the lower stub tube weld of a CRD housing, and/or adjacent a J-weld and stub tube weld buildup of an ICMH, more quickly and more easily than known methods. The repair may be performed in-situ, without having to remove a substantial portion of an elongate member such as CRD housing 50 or ICMH 150 and associated hydraulic lines. In addition, such repairs may be substantially completed in-situ from below the bottom head dome, and may significantly reduce stresses typically caused by thermal growth mismatches between the CRD and/or ICMH and the bottom head dome.

The attachment weld does not affect the existing stub tube and the upper housing section, so there are no additional stresses induced from the process of attaching the existing lower portion 92/192 to the bottom head dome opening 52 at sidewall 54, which remains in place for the in-situ repair, to the CRD 50. The exemplary methodologies may permanently mitigate the potential damage due to leaking CRD stub tubes or ICMH stub tube weld buildups, regardless of origin, without adversely affecting the remaining CRD/ICMH. Additionally, since the existing lower portion remains in place for the in-situ repair, there are minimal alignment issues, and existing hydraulic lines are unaffected. Moreover, overall implementation time may be shorter than current permanent repair options, reducing critical path outage time and reducing the dose received by maintenance personnel during the repair.

The exemplary embodiments of the present invention being thus described, it will be obvious that the same may be varied in many ways. For example, the cladding techniques may be applied to attachment weld in repairs where a lower portion member such as a replacement lower portion of a CRD housing or ICMH is inserted in place of a defective lower portion and welded to an upper portion of a CRD housing/ICMH and/or a sidewall of a bottom head dome opening in a reactor pressure vessel. Such variations are not to be regarded as a departure from the spirit and scope of the invention, and all such modifications as would be obvious to one skilled in the art are intended to be included within the scope of the following claims.

What is claimed is:

1. An in-situ repair method to seal a hollow, elongate member which extends into a reactor pressure vessel of a boiling water reactor and penetrates through a bottom head dome opening of a bottom head dome forming a lower end of the reactor pressure vessel, the reactor pressure vessel including a stub tube having a first end, a second end and a stub tube bore extending between the first and second ends that is aligned with the bottom head dome opening, the elongate member extending upward from the bottom head dome through the bottom head dome opening and through the stub tube bore, the elongate member secured to the stub tube adjacent the first, end with an upper stub tube attachment weld, the method comprising:

cutting the elongate member at a given location below the second end of the stub tube to remove a section of the elongate member so as to form an upper portion which extends upward into the stub tube bore and reactor pressure vessel interior of the boiling water reactor, and a lower portion which extends downward through the bottom head dome opening to an undervessel area beneath the reactor pressure vessel, wherein an opening is provided at the given location between the upper and lower portions where the section was removed, and applying a weld to attach the lower portion to the reactor pressure vessel so as to seal off potential leakage paths of reactor coolant between the upper portion and lower portion and through the bottom head dome sidewall to the undervessel area.

2. The method of claim 1, wherein attaching includes attaching the lower portion to a different location than the location where the elongate member was cut.

3. The method of claim 1, wherein
the lower portion includes an upper end, and
applying further includes:
forming the weld on an interior surface of the reactor pressure vessel at the upper end, application of the weld forming a heat affected zone.

4. The method of claim 3, further comprising:
applying a corrosion resistant material so as to substantially cover the heat affected zone.

5. The method of claim 4, wherein applying a corrosion resistant material further includes applying a corrosion resistant cladding alloyed with a noble metal so as to substantially cover the heat-affected zone.

6. The method of claim 4, wherein the applied corrosion resistant material is at a thickness in a range of at least about 0.3 to 0.6 mm.

7. The method of claim 6, wherein the applied corrosion resistant material is at a thickness in a range of 0.36 to 0.45 mm.

8. A control rod drive housing in a reactor pressure vessel of a nuclear reactor sealed in accordance with the method of claim 1.

9. A method for sealing an elongate hollow member in-situ within a reactor pressure vessel of a boiling water reactor, the reactor pressure vessel including a bottom head dome forming a lower end of the reactor pressure vessel, a stub tube, and the elongate hollow member, the bottom head dome having a bottom head dome opening, the stub tube having first and second ends with a bore there between that is aligned with the bottom head dome opening, the elongate member extending upward from an undervessel area through the bottom head dome opening and aligned stub tube bore, the elongate member secured to the stub tube adjacent the stub tube first end with an upper stub tube attachment weld, the method comprising:

cutting out a section of the elongate member at a location below the upper stub tube weld to separate the elongate member into an upper portion which extends upward into the stub tube bore and reactor pressure vessel interior of the boiling water reactor, and a lower portion which extends downward through the bottom head dome opening to the undervessel area beneath the reactor pressure vessel;

attaching the lower portion to a different location at the bottom head dome opening than where the elongate member was cut with a weld that is formed on an interior surface of the bottom head dome opening at an upper end of the lower portion, application of the weld forming a heat affected zone; and applying a corrosion resistant material on the heat-affected zone.

10. The method of claim 9, wherein applying further includes applying a corrosion resistant cladding alloyed with a noble metal so as to substantially cover the heat-affected zone.

11. The method of claim 9, wherein the applied corrosion resistant material is at a thickness in a range of at least about 0.3 to 0.6 mm.

12. The method of claim 11, wherein the applied corrosion resistant material is at a thickness in a range of 0.36 to 0.45 mm.

13. A control rod drive housing in a reactor pressure vessel of a nuclear reactor sealed in accordance with the method of claim 9.

* * * * *